(12) United States Patent
Varkey et al.

(10) Patent No.: US 9,309,439 B2
(45) Date of Patent: *Apr. 12, 2016

(54) SEALANT AND ADHESIVE USING GREEN PREPOLYMER

(75) Inventors: Jyothi Thazhakuzhy Varkey, Shakopee, MN (US); Jayesh Neginbhai-Patel, Shakopee, MN (US); Robert Louis Ferenz, Chaska, MN (US); Patrick Knoll, Minneapolis, MN (US)

(73) Assignee: Construction Research & Technology GmbH, Trostberg (DE)

( * ) Notice: Subject to any disclaimer, the term of this patent is extended or adjusted under 35 U.S.C. 154(b) by 326 days.

This patent is subject to a terminal disclaimer.

(21) Appl. No.: 13/811,070

(22) PCT Filed: Jul. 18, 2011

(86) PCT No.: PCT/EP2011/062264
§ 371 (c)(1),
(2), (4) Date: Jun. 6, 2013

(87) PCT Pub. No.: WO2012/010559
PCT Pub. Date: Jan. 26, 2012

(65) Prior Publication Data
US 2013/0303690 A1    Nov. 14, 2013

Related U.S. Application Data

(60) Provisional application No. 61/366,695, filed on Jul. 22, 2010.

(51) Int. Cl.
| | | |
|---|---|---|
| *C08G 18/12* | (2006.01) | |
| *C08G 18/40* | (2006.01) | |
| *C08G 18/42* | (2006.01) | |
| *C08G 18/48* | (2006.01) | |
| *C08G 18/75* | (2006.01) | |
| *C08K 5/00* | (2006.01) | |
| *C08K 5/12* | (2006.01) | |
| *C08L 93/04* | (2006.01) | |
| *C09D 175/04* | (2006.01) | |
| *C09J 175/04* | (2006.01) | |

(52) U.S. Cl.
CPC ............ *C09D 175/04* (2013.01); *C08G 18/12* (2013.01); *C08G 18/4018* (2013.01); *C08G 18/4288* (2013.01); *C08G 18/4891* (2013.01); *C08G 18/755* (2013.01); *C09J 175/04* (2013.01); *C08G 2190/00* (2013.01); *C08K 5/0016* (2013.01); *C08K 5/12* (2013.01); *C08L 93/04* (2013.01); *Y02P 20/582* (2015.11)

(58) Field of Classification Search
CPC .... C08G 18/00; C08G 18/16; C08G 18/3203; C08G 18/3206; C08G 18/48; C08G 18/4812; C08G 18/4816; C08G 18/4891; C08G 18/6511; C08G 18/6517; C08G 18/6588; C08G 18/72; C08G 18/73; C08G 18/75; C08G 18/76; C08G 18/82; C08G 18/12; C08G 18/4018; C08G 18/755; C08G 2190/00; C08J 3/00; C08J 3/20; C08J 3/24; C08J 2375/00; C08J 2375/06; C08J 2375/08; C08K 3/00; C08K 3/0033; C08K 5/00; C08K 5/0016; C08K 5/43; C08K 5/435; C08K 5/12; C08L 75/04; C08L 75/06; C08L 75/08; C08L 2312/00; C08L 93/04; C09D 5/04; C09D 7/002; C09D 7/007; C09D 7/12; C09D 175/04; C09D 175/06; C09D 175/08; C09J 175/04; C09J 175/06; C09J 175/08; Y02P 20/582
USPC .................................................. 524/589, 590
See application file for complete search history.

(56) References Cited

U.S. PATENT DOCUMENTS

| | | | | |
|---|---|---|---|---|
| 5,229,454 | A * | 7/1993 | Weichmann | 524/714 |
| 5,266,145 | A | 11/1993 | Duck et al. | |
| 7,612,151 | B2 | 11/2009 | Minamida et al. | |
| 2004/0229048 | A1 | 11/2004 | Kesselmayer | |
| 2006/0004175 | A1 | 1/2006 | Kollbach et al. | |
| 2006/0264524 | A1 | 11/2006 | Abraham et al. | |
| 2007/0232764 | A1 | 10/2007 | Minamida et al. | |
| 2008/0292902 | A1 | 11/2008 | Reid | |
| 2009/0062432 | A1 | 3/2009 | Doesburg et al. | |
| 2010/0197878 | A1 | 8/2010 | Casati et al. | |
| 2013/0267637 | A1 * | 10/2013 | Varkey et al. | 524/270 |

FOREIGN PATENT DOCUMENTS

| | | |
|---|---|---|
| EP | 1 734 095 A1 | 12/2006 |
| WO | WO 2009/020774 A1 | 2/2009 |
| WO | WO 2012/010558 A1 | 1/2012 |

OTHER PUBLICATIONS

Author unknown, "Vertellus Polycin GR Polyols", G. R. O'Shea Company Product Bulletin, Apr. 17, 2007.*
PCT/EP2011/062264—International Search Report, Jan. 6, 2012.
PCT/EP2011/062264—International Written Opinion, Jan. 6, 2012.
PCT/EP2011/062264—International Preliminary Report on Patentability, Jan. 22, 2013.

* cited by examiner

*Primary Examiner* — Patrick Niland
(74) *Attorney, Agent, or Firm* — Curatolo Sidoti Co., LPA; Joseph G. Curatolo; Salvatore A. Sidoti

(57) ABSTRACT

A polyurethane prepolymer comprising the reaction product of a reactant formulation comprising a polyol entirely derived from a natural oil; a natural oil-petroleum blend polyol; an isocyanate, at least one catalyst, drying agent, and plasticizer, wherein the prepolymer has a bio-based content of from about 15% to about 75% by weight. The prepolymer may be used in adhesive, or sealant compositions.

21 Claims, 4 Drawing Sheets

US 9,309,439 B2

SEALANT AND ADHESIVE USING GREEN PREPOLYMER

CROSS REFERENCE TO RELATED APPLICATIONS

This application is a national stage application of International Application No. PCT/EP2011/062264, filed 18 Jul. 2011, which claims priority from U.S. Provisional Patent Application No. 61/366,695, filed 22 Jul. 2010, from which applications priority is claimed, and which are incorporated herein by reference.

Most currently marketed urethane sealants and adhesives are based predominantly on petroleum derived polyols. Petrochemicals am subject to fluctuations in price and availability dictated by the demands of the energy markets, limited reserves of fossil fuels and oils, and political volatility. Petroleum based components additionally adversely affect the environment as they may impart high volatile organic contents to polyurethane compositions.

There has been growing interest in the use of bio-based renewable resources such as vegetable oil-based polyols as raw-material feedstocks to reduce demand for non-renewable fossil fuels and to cut production of carbon dioxide "greenhouse" gas to reduce global warming. It would be advantageous to provide sealants and adhesives based, in significant part, on "natural-oil polyols" produced from renewable vegetable sources, which can be formulated to tailor the properties and performance to suit particular end use applications and which have high bio-based content and low volatile organic content.

Bio-based sources such as soy oil, castor oil, palm oil, linseed oil, etc. have been suggested as desirable alternatives to petroleum-based components in polyurethane compositions, as renewable raw materials offer cost advantages and alleviate environmental concerns by decreasing the petrochemical content of formulations. However, it was not previously known to use blends of 100% vegetable oil-based polyols and petro-bio blend polyols for the synthesis of a green prepolymer which is subsequently used to produce a paintable, one component, moisture cure sealant and/or a one component, moisture cure, trowel grade urethane wood floor adhesive, that are environmentally friendly, have low VOC, include renewable content and recycled filler, and are optionally phthalate-free, tin-free, and solvent-free.

DETAILED DESCRIPTION

Figure 1:
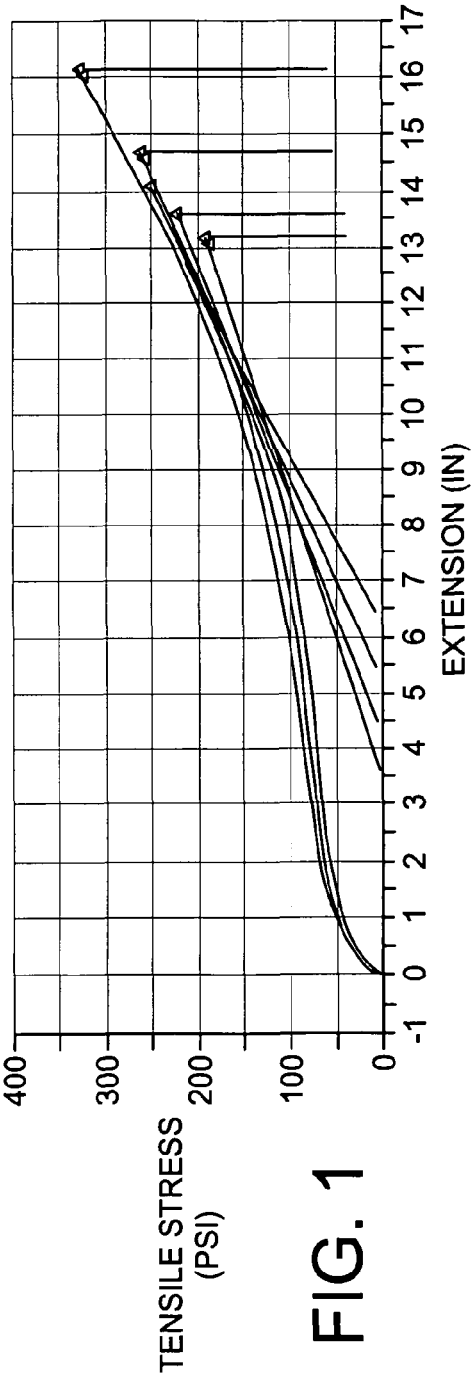
FIG. 1 is a graphical representation of the results of an ASTM D412 Tensile Test for the Green Sealant of Example 8.

A polyurethane prepolymer based substantially on renewable raw materials is provided comprising the reaction product of a reactant formulation comprising (a) a polyol entirely derived from a natural oil; (b) a natural oil-petroleum blend polyol; (c) an isocyanate; (d) at least one catalyst, (e) drying agent; and (f) plasticizer, wherein the prepolymer has a bio-based content of from about 15% to about 75% by weight.

For purposes of illustration but not by way of limitation, the polyol entirely derived from natural oil may be essentially a vegetable oil derivative (such as a 100% vegetable oil polyol). In certain embodiments, suitable polyols entirely derived from natural oil are 100% castor oil based polyols, such as those available commercially from Vertellus Performance Material Inc. (Greensboro, N.C.). In certain embodiments, the 100% castor oil based polyol has at least one of an average molecular weight (Mn) of about 3400 to about 4000 grams/mole, a functionality of 2 and a hydroxyl number from 33 to 40.

In certain embodiments, the 100% castor oil based polyol is Polycin® GR-35 Polyol from Vertellus Performance Material Inc., a 100% solids, castor oil based polyol having a molecular weight of 3450, a viscosity (cP) of 2000, and a functionality of 2.

The amount of polyol entirely derived from a natural oil that is used typically may be about 45% to about 65% in certain embodiments about 58% to about 62% by weight, based on the total weight of the prepolymer.

For purposes of illustration but not by way of limitation, the natural oil-petroleum blend polyol comprises a castor oil-petroleum blend polyol having a functionality of from about 2 to about 2.75. In certain embodiments, the natural oil-petroleum blend polyol may comprise Lupranol® BALANCE 50 from Elastogran GmbH of BASF Group, a polyether polyol having a functionality of from about 2 to about 2.75 based on a renewable raw material which contains mainly secondary hydroxy groups, being 31% castor oil based and the remainder petroleum based. In other embodiments, the natural oil/petroleum ratio may be 20/80. The amount of natural oil-petroleum blend polyol that is typically used in the prepolymer may be about 15% to about 45%, in certain embodiments about 19% to about 22% by weight, based on the total weight of the prepolymer.

For purposes of illustration but not by way of limitation, the isocyanate may be aromatic, aliphatic or cycloaliphatic and may have an average functionality equal to about 2.

For purposes of illustration but not by way of limitation, the isocyanate may comprise at least one of toluene diisocyanates, methylene diphenyl diisocyanates, phenylene diisocyanate, xylylene diisocyanate, diphenylmethane diisocyanate, polyphenzylmethane polyisocyanate (Polymeric MDI), naphthalene diisocyanate, triphenylmethane triisocyanate, diphenyl sulfone diisocyanate, cyclohexane diisocyanates, ethylene diisocyanate, propylene diisocyanate, tetramethylene diisocyanate, hexamethylene diisocyanates, isophorone diisocyanate, dimers and trimers of these diisocyanates or mixtures thereof.

For purposes of illustration but not by way of limitation, in certain embodiments, the isocyanate may comprise at least one of toluene 2,4-diisocyanate, toluene 2,6-diisocyanate, naphthylene 1,5-diisocyanate, 4,4'-methylene diphenyl diisocyanate, 2,4'-methylene diphenyl diisocyanate, 1-methyl-2,4-diisocyanatocyclohexane, 1-methyl-2,6-diisocyanatocyclohexane, 4,4'-dicyclohexylmethane diisocyanate, urethodione diisocyanate, isocyanurate triisocyanate, hexamethylene-1,6-diisocyanate, tetramethylene-1,4-diisocyanate, cyclohexane-1,4-diisocyanate, hexahydrotolylene diisocyanate (and isomers), 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate; and 3,3'-dimethyldipenylmethane-4,4'-diisocyanate, dimers and trimers of these isocyanates, or mixtures thereof.

For purposes of illustration but not by way of limitation, in some embodiments the isocyanate may comprise at least one of 1-isocyanatomethyl-3-isocyanato-1,5,5-trimethyl diisocyanate (isophorone diisocyanate, IPDI), toluene diisocyanate (TDI), methylene diphenyl diisocyanate (MDI), or mixtures thereof.

For purposes of illustration but not by way of limitation, in certain embodiments, the isocyanate may be a monomeric cycloaliphatic diisocyanate commercially available as Desmodur I (IPDI) marketed by Bayer Material Science. The amount of isocyanate that is typically used in the prepolymer may be about 10% to about 22%, in certain embodiments about 10% to about 14% by weight, based on the total weight of the prepolymer.

For purposes of illustration but not by way of limitation, the reactant formulation additionally may comprise at least one catalyst, plasticizer and drying agent. In certain embodiments, the reactant formulation may additionally comprise at least one of organic fillers, inorganic fill, chain extenders, antioxidants, UV stabilizers, light stabilizers, fungicides, mildewcides, biocides, tire retardants, surface additives, coloring agents, solvents, mineral oils, thixotropic agents, dispersing agents, adhesion promoters, defoaming agents, storage stabilizers, latent hardeners, cure retarders, or mixtures thereof.

In certain embodiments, one or more tertiary amine catalysts capable of accelerating the isocyanate-polyol reaction may be used. For purposes of illustration but not by way of limitation, suitable tertiary amine catalysts include Dabco 33LV or Daboo BL-19, available from Air Products & Chemicals, Inc., metal catalysts such as Dibutyl Tin Dilaurate (DBTDL) or mixtures thereof. The amount of catalyst typically used may be about 0.05% to about 1%, in certain embodiments about 0.1% to about 0.4% by weight, based on the total weight of the prepolymer.

For purposes of illustration but not by way of limitation, the drying agent may comprise pare toluene sulfonyl isocyanate (PTSI). The amount of drying agent typically used usually may be about 0.5% to about 3%, in certain embodiments, about 1% to about 2% by weight, based on the total weight of the prepolymer.

For purposes of illustration but not by way of limitation, the plasticizer may comprise at least one of adipate, azelainate, sebacate, sulfonate, trimellitate, phosphate, fumarate, or maleate ester or diester, or mixtures thereof.

For illustration purposes but not by way of limitation, the plasticizer may comprise at least one of dioctyl adipate, 2-ethylhexyl adipate, diisononyl adipate, or diisodecyl adipate, di(2-ethylhexyl)azaelainate, di(2-ethylhexyl)sebacate, phenyl alkylsulfonates, tri(2-ethylhexyl)trimellitate, triphenyl phosphate, tricresyl phosphate, trixylenyl phosphate, cresyl diphenyl phosphate, xylenyl diphenyl phosphate, butyl fumarate, bis(2-methylpropyl) fumarate, diisobutyl fumarate, or bis(2-ethylhexyl) fumarate, dimethyl maleate or diethyl maleate, or mixtures thereof.

For purposes of illustration but not by way of limitation, in certain embodiments the plasticizer may be a phthalate-free plasticizer. In certain embodiments, suitable phthalate-free plasticizers include Hexamoll® DINCH available from BASF. The amount of plasticizer typically used may be about 5% to about 8%, in certain embodiments about 6% to about 7% by weight, based on the total weight of the prepolymer.

In certain embodiments, the polyurethane prepolymer comprises the reaction product of a reactant formulation comprising:
  a. from about 45% to about 65%, in certain embodiments about 58% to about 62% by weight, based on the total weight of the prepolymer, of a 100% castor oil based polyol having a functionality of 2,
  b. from about 15% to about 45%, in certain embodiments about 19% to about 22% by weight, based on the total weight of the prepolymer, of a castor oil-petroleum blend polyol having a functionality of about 2 to about 2.75;
  c. from about 10% to about 22%, in certain embodiments about 10% to about 14% by weight, based on the total weight of the prepolymer, of isophorone diisocyante (IPDI);
  d. from about 0.05% to about 1% by weight, in certain embodiments about 0.1% to about 0.4% by weight, based on the total weight of the prepolymer, of at last one tertiary amine catalyst;
  e. from about 5% to about 8% by weight, in certain embodiments about 6% to about 7% by weight, based on the total weight of the prepolymer, of a phthalate-free plasticizer; and
  f. from about 0.5% to about 3% by weight, in certain embodiments about 1% to about 2% by weight, based on the total weight of the prepolymer, of a drying agent;
  wherein the prepolymer has a bio-based content of about 15% to about 75% by weight.

In certain embodiments, the prepolymer may have an NCO content of from about 1% to about 3% by weight, and in certain embodiments about 2% to about 2.98% by weight, as measured by 0.1N HCl Titration using an automatic titrator, as per ASTM D-2572-80 (Test method for Isocyanate Groups in Urethane Prepolymers).

In certain embodiments, the viscosity of the polyurethane prepolymer may be in the range of 50 poise to 500 poise at 24° C. (72° F.), and in certain embodiments from 118 poise to 300 poise at 24° C. (72° F.), as measured by Brookfield viscometer.

In certain embodiments, the bio-based content of the prepolymer may be from about 15% to about 75%, and in certain embodiments from 15% to 40% by weight.

In certain embodiments, the polyurethane prepolymer has zero to very low volatile organic content (VOC) and a high bio-based content in the range of from about 15% to about 75% by weight.

In certain embodiments, the polyurethane prepolymer may have a peak molecular weight (Mp) in the range of 10,000 to 100,000, as measured by GPC (Gel Permeation Chromatography).

A method is provided for making a polyurethane prepolymer comprising reacting a polyol entirely derived from a natural oil, a natural oil-petroleum blend polyol, an isocyanate, at least one catalyst, (optionally a tertiary amine catalyst), plasticizer, and drying agent, for a sufficient time to produce a polyurethane prepolymer, wherein the prepolymer has a bio-based content of from about 15% to about 75% by weight.

In certain embodiments, the polyurethane prepolymers are suitable as an adhesive or sealant or coating component for the adhesive bonding of substrates including, but not limited to, at least one of concrete, stone, metal, ceramic, glass, plastic, wood, asphalt, vinyl, carpet, thermoplastic materials, thermoset materials, rubber or composite materials.

In certain embodiments, the "green" adhesive utilizes bio-based raw materials, recycled materials, non-tin based catalysts, and is phthalate free.

In certain embodiments, a one component, moisture-curable, trowel grade polyurethane adhesive is provided comprising:
  a) a polyurethane prepolymer comprising the reaction product of a reactant formulation comprising a polyol entirely derived from a natural oil, a natural oil-petroleum blend polyol, an isocyanate, at least one catalyst, plasticizer, and drying agent, and
  b) at least one additive comprising organic fillers, inorganic fillers, plasticizers, chain extenders, antioxidants, UV stabilizers, light stabilizers, fungicides, mildewcides, biocides, fire retardants, surface additives, coloring agents, solvents, mineral oils, thixotropic agents, dispersing agents, adhesion promoters, catalysts, defoaming agents, storage stabilizers, latent hardeners, drying agents, cure retarders, or mixtures thereof.

In certain embodiments, the prepolymer is prepared by providing polyols, and then adding isocyanate, plasticizer, catalyst, and drying agent. Once the experimental NCO % is close to theoretical NCO %, the batch is allowed to cool and drying agent is added.

In certain embodiments, the adhesive may exhibit at least one of a bio-based content of from about 10% to about 20% by weight, an adhesive strength of from about 100 to about 175 psi as measured by lap shear testing and a viscosity of from about 1200 poise to about 2000 poise at 24° C. (72° F.).

A method is provided for making a moisture-curable polyurethane adhesive capable of curing to form a reaction product, comprising a) providing a polyurethane prepolymer which is a product of the reaction of a reactant formulation comprising a polyol entirely derived from a natural oil, a natural oil-petroleum blend polyol, an isocyanate, at least one catalyst, plasticizer, and drying agent, and
  b) admixing with the polyurethane prepolymer at least one additive comprising organic fillers, inorganic fillers, plasticizers, chain extenders, antioxidants, UV stabilizers, light stabilizers, fungicides, mildewcides, biocides, fire retardant, surface additives, coloring agents, solvents, mineral oils, thixotropic agents, dispersing agents, adhesion promoters, catalysts, defoaming agents, storage stabilizers, latent hardeners, drying agents, cure retarders or mixtures thereof for a sufficient time to produce the polyurethane adhesive.

In certain embodiments, the adhesive may exhibit at least one of a bio-based content of from about 10% to about 20% by weight, an adhesive strength of from about 100 to about 175 psi as measured by lap shear testing, and a viscosity of from about 1200 poise to about 2000 poise at 24° C. (72° F.).

In certain embodiments, a paintable, one component, moisture curable polyurethane sealant having renewable content and optionally recycled filler, with zero to very low VOC, that is optionally phthalate-free, tin-free, PVC-free, halogen-free, and solvent-free, is provided comprising (a) a polyurethane prepolymer comprising the reaction product of a reactant formulation comprising a polyol entirely derived from a natural oil, a natural oil-petroleum blend polyol, an isocyanate, at least one catalyst, plasticizer, and drying agent, and (b) at least one additive comprising organic fillers, inorganic fillers, plasticizers, chain extenders, antioxidants, UV stabilizers, light stabilizers, fungicides, mildewcides, biocides, fire retardants, surface additives, coloring agents, solvents, mineral oils, thixotropic agents, dispersing agents, adhesion promoters, catalysts, defoaming agents, storage stabilizers, latent hardeners, drying agents, cure retarders or mixtures thereof.

The sealant may exhibit at least one of a bio-based content of from about 5% to about 28% by weight, a 100% Modulus of from about 40 to about 85 psi, an elongation at break of from about 400% to about 850%, a Shore A hardness of from about 20 to about 50, a tensile strength of from about 150 to about 405 psi, a viscosity of from about 3500 to about 8500 poise at 24° C. (72° F.), and a sag of from about 0 to about 0.18 inch.

The sealant is compliant with ASTM C920, ISO 11600, DIN and JIS standards at a minimum with targeted joint movement of +/−35%.

Also provided is a method for making a moisture-curable polyurethane sealant capable of curing to form a reaction product, comprising providing a polyurethane prepolymer which is a product of the reaction of a polyol entirely derived from a natural oil, a natural oil-petroleum blend polyol, an isocyanate, at least one catalyst, plasticizer, and drying agent; and admixing with the polyurethane prepolymer at least one additive comprising organic fillers, inorganic fillers, plasticizers, chain extenders, antioxidants, UV stabilizers, light stabilizers, fungicides, mildewcides, biocides, fire retardants, surface additives, coloring agents, solvents, mineral oils, thixotropic agents, dispersing agents, adhesion promoters, catalysts, defoaming agents, storage stabilizers, latent hardeners, drying agents, cure retarders or mixtures thereof for a sufficient time to produce a polyurethane sealant.

The sealant may exhibit at least one of a bio-based content of from about 5% to about 28% by weight, a 100% Modulus of from about 40 to about 85 psi, an elongation at break of from about 400% to about 850%, a Shore A hardness of from about 20 to about 50, a tensile strength of from about 150 to about 405 psi, a viscosity of from about 3500 to about 8500 poise at 24° C. (72° F.), and a sag of from about 0 to about 0.18 inch.

For purposes of illustration but not by way of limitation, the green polyurethane adhesive and green polyurethane sealant formulations may comprise in addition to the polyols, isocyanate, catalyst, plasticizer and drying agent of the prepolymer, components which may include, but are not limited to, at least one of organic fillers, inorganic filers, plasticizers, chain extenders, antioxidants, UV stabilizers, light stabilizers, fungicides, mildewcides, biocides, fire retardants, surface additives, coloring agents, solvents, mineral oils, thixotropic agents, dispersing agents, adhesion promoters, catalysts, defoaming agents, storage stabilizers, latent hardeners, drying agents, cure retarders or mixtures thereof.

In certain embodiments, the total amount of such additives may be from about 10 to about 50 weight percent; and in certain embodiments about 25 to about 40 weight percent, based on the total weight of the polyurethane formulation.

By way of example, but not of limitation, the green polyurethane adhesive and green polyurethane sealant formulations may contain from 0 to about 5 percent by weight of UV absorbers, from 0 to about 5 percent by weight of antioxidants, from 0 to about 2 percent by weight of mildewcides, from 0 to about 2 percent by weight of biocides, from 0 to about 2 percent by weight of fungicides, from 0 to about 20 percent by weight of fire or flame retardants, from 0 to about 10 percent by weight of pigments, from 0 to about 5 percent by weight of catalysts, from 0 to about 5 percent by weight of adhesion promoters, from 0 to about 10 percent by weight of flow and leveling additives, from 0 to about 5 percent by weight of wetting agents, from 0 to about 2 percent by weight of antifoaming agents, from 0 to about 5 percent by weight of storage stabilizers, from 0 to about 10 percent by weight of latent hardeners, from 0 to about 30 percent by weight of plasticizers, from 0 to about 30 percent by weight of dispersing agents, from 0 to about 10 percent by weight solvents, and in certain embodiments from 3 percent to about 10 percent by weight solvents, from about 20 to about 50 percent by weight of fillers, from about 0 to about 5 percent by weight of drying agents, and/or from 0 to about 20 percent by weight of rheology modifiers.

Representative Examples of Plasticizer are Enumerated Above.

In certain embodiments, a rheology modifier may be added to increase the viscosity of the adhesive or sealant immediately ater application to a substrate. This can prevent the adhesive or sealant from dripping or running when initially applied to a substrate. For illustration purposes but not by way of limitation, the rheology modifier comprises at least one of polyureas, fumed silica, hydroxyethyl cellulose, hydroxypropyl cellulose, polyamide waxes, modified castor oil, clay intercalated with organic cations, calcium carbonate, talc, acrylate polymers, PVC plastisols, polyurea-plasticizer dispersions, or mixtures thereof. Talc may be used as a filler and/or a rheology modifier.

To reduce costs and add recycled content, in certain embodiments various fillers may be used in the adhesive and sealant formulations. For example, a filler may be a solid that is inert to other materials in the formulation. For purposes of illustration but not by way of limitation, the filler may comprise at least one of recycled fillers, organic fibers, inorganic fibers, rubber particles, cork particles, carbon black, titanium dioxide, glass, crushed glass, glass spheres, iron particles, quartz, silica, amorphous precipitated silica, hydrophilic fumed silica, hydrophobic fumed silica, kaolin, mica, diatomaceous earth, talc, zeolites, clays, aluminum hydroxide, sulfates, aluminum sulfate, barium sulfate, calcium carbonate, dolomite, calcium sulfate, barites, limestone, wollastonite, perlite, flint powder, kryolite, alumina, alumina trihydrate, polymer granules, polymer powders, granulated or micronized polyethylene granulated or micronized polypropylene, melamine, polypropylene fibers, nylon fibers, zinc oxide, or mixtures thereof. Carbon black and titanium dioxide may be used as both a filler and a pigment.

In certain embodiments, while not required, a solvent can be used to aid processing and/or as a diluent. In certain embodiments, the plasticizer can function both as a plasticizer and a solvent. In certain embodiments the amount of plasticizer (solvent) may be from about 5 to about 30 weight percent. For purposes of illustration but not by way of limitation, suitable examples of solvents include, but are not limited to, alkyl oleates, biodiesel, aliphatic hydrocarbons such as mineral spirits, aromatic hydrocarbons such as toluene, xylene, solvent naphtha, and Aromatic 100, esters such as ethyl acetate, butyl acetate, and propylene glycol diacetate, ethers such as dipropylene glycol dimethyl ether, ketones such as methyl ethyl ketone, methyl isobutyl ketone, and cyclohexanone, and mixtures thereof.

Antioxidants, UV absorbers, stabilizers mildewcides, biocides, and fungicides are materials known to those skilled in the art, and protect the sealant and adhesive formulations from harmful effects of weathering and biological agents.

In certain embodiments, an antioxidant may be added to the sealant or adhesive formulations to improve the long-term oxidation resistance. For purposes of illustration but not by way of limitation, antioxidants may comprise, among others, alkylated monophenols, alkylthiomethylphenols, hydroquinones and alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, benzylphosphonates, acylaminophenols, eaters of beta(3,5-di-tert-butyl-4-hydroxyphenyl)propionic acid with mono- or polyhydric alcohols, esters of beta-(5-tert-butyl-4-hydroxy-3-methylphenyl)propionic acid with mono- or polyhydric alcohols, esters of beta-(3,5-dicyclohexyl-4-hydroxyphenyl) propionic acid with mono- or polyhydric alcohols, esters of 3,5-di-tert-butyl-4-hydroxyphenyl acetic acid with mono- or polyhydric alcohols, amides of beta-(3,5-di-tert-butyl-4-hydroxyphenyl)propionic acid, ascorbic acid and derivatives, aminic antioxidants, and mixtures thereof. If used, the amount of antioxidant in certain embodiments may be about 0.1 to about 2 weight percent, based on the total weight of the polyurethane formulation. For purposes of illustration but not by way of limitation, various commercially available antioxidants may be used, such as IRGANOX1076, an octadecyl 3,5-di-tert-butyl 4 hydroxyhydrocinnamate marketed by Ciba Corporation.

In certain embodiments, UV stabilizers may be included in the adhesive or sealant formulation. For purposes of illustration but not by way of limitation, UV stabilizers may comprise, among others, 2-(2'-hydroxyphenyl)benzotriazoles, 2-hydroxybenzophenones, esters of substituted and unsubstituted benzoic acids, acrylates, nickel compounds, sterically hindered amines, oxanilides, 2-(2-hydroxyphenyl)-1,3,5-triazines, and mixtures thereof.

For purposes of illustration but not by way of limitation, fungicides, mildewcides, and biocides, if used in the adhesive or sealant formulation, may comprise, among others, 4,4-dimethyloxazolidine, 3,4,4-trimethyloxazolidine, modified barium metaborate, potassium N-hydroxy-methyl-N-methyldithiocarbamate, 2-(thiocyanomethylthio)benzothiazole, potassium dimethyl dithiocarbamate, adamantan, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, copper 8-quinolinate, and mixtures thereof.

In certain embodiments, fire retardants may be used in the adhesive or sealant formulations. Fire retardants may comprise any material that provides self extinguishing properties. For purposes of illustration but not by way of limitation, the fire retardant may include phosphates such as triphenyl phosphate, polyammonium phosphate, monoammonium phosphate, or tri(2-chloroethyl)phosphate, exfoliated graphite, acid treated natural graphite flakes, and mixtures thereof. The fire retardant may be a liquid or a solid. A solid fire retardant may be ground to a micron size, typically referred to by those skilled in the art as micronized. Additionally, the fire retardant may include but is not limited to self extinguishing agents and flame retardants.

In certain embodiments, the adhesive or sealant formulations may also comprise a coloring agent, such as a pigment or a dye, to provide a desired color to the formulation. For purposes of illustration but not by way of limitation, coloring agents may include carbon black and titanium dioxide which may be in the rutile form, but other coloring agents may also be useful. Carbon black and titanium dioxide may act as both pigments and fillers in the formulation. For purposes of illustration but not by way of limitation, additional examples of pigments include, but are not limited to, barium sulfate, zinc oxide, zinc sulfide, basic lead carbonate, antimony trioxide, lithopones (zinc sulfide and barium sulfate), inorganic color pigments such as iron oxides, carbon black, graphite, luminescent pigments, zinc yellow, zinc green, ultramarine, manganese black, antimony black, manganese violet, Paris blue, and Schweinfurter grew, organic color pigments such as sepia, gamboge, Cassel brown, toluidine red, para red, Hansa yellow, indigo, azo dyes, anthraquinonoid and indigoid dyes, as well as dioxazine, quinacridone, phthalocyanine, isoindolinone, and metal complex pigments, and mixtures thereof.

In certain embodiments, the adhesive or sealant formulations may additionally comprise surface additives such as flow and leveling additives, wetting agents, and dispersing agents to facilitate application of the material. For purposes of illustration but not by way of limitation, examples of flow and leveling additives, wetting agents, and antifoaming agents may include silicones, modified silicones, polyacrylates, and hydrocarbons such as petroleum components and mixtures. For purposes of illustration but not by way of limitation, examples of suitable flow additives may include, but are not limited to, polyester modified acrylic functional poly-di-methyl siloxanes such as BYK®-371, BYK® P-104, and polyacrylate copolymers such as BYK®-358, (all available from BYK-Chemie USA, Wallingford, Conn.), and fluorosurfactants such as 3M™ FLUORAD™ FC-4430 Fluorosurfactant (available from 3M Company, St. Paul, Minn.).

In certain embodiments, adhesion promoters may also be used in the adhesive or sealant formulations. For purposes of illustration but not by way of limitation, adhesion promoters may include, but are not limited to, at least one of 2-aminoethyl-dimethylmethoxysilane, 6-aminohexyl-tributoxysilane, 3-aminopropyl-trimethoxysilane, 3-aminopropyl-triethoxysilane, 3-aminopropyl-methyldimethoxysilane, 3-aminopropyl-methyldiethoxysilane, 5-aminopentyl-trimethoxysilane, 5-aminopentyl-triethoxysilane, 3-aminopropyl-triisopropoxysilane, γ-glycidoxypropyltrimetoxysilane, γ-glycidoxypropyltriethoxysilane, γ-mercaptopropyltrimethoxysilane, γ-mercaptopropyltriethoxysilane, γ-ureidopropyltrimethoxysilane, γ-ureidopropyltriethoxysilane, 1-[3-(trimethoxysilyl)propyl]urea, 1-[3-(triethoxysilyl)propyl]urea, [3-(2-aminoethylamino)propyl]trimethoxysilane, [3-(2-aminoethylamino)propyl]triethoxysilane, 2-(3,4-epoxycyclohexyl)ethyl-trimethoxysilane, 2-(3,4-epoxycyclohexyl)ethyl-triethoxysilane, 3-(phenylamino)propyl-trimethoxysilane, 3-(phenylamino)propyl-triethoxysilane, bis[3-(trimethoxysilyl)propyl]amine, bis[3-(triethoxysilyl)propyl]amine, 3-mercaptopropyl-methyldimethoxysilane, 3-mercaptopropyl-methyldiethoxysilane, [3-(2-aminoethylamino)propyl]methyl dimethoxysilane, [3-(2-aminoethylamino)propyl]methyl diethoxysilane, 3-glycidoxypropyl methyldimethoxysilane, or 3-glycidoxypropyl-methyldiethoxysilane, or combinations thereof.

One or more storage stabilizers can be used, including para toluene sulfonyl isocyanate (PTSI).

One or more latent hardeners which are Inactive at room temperature but act as a curing agent at elevated temperatures may be used, including, but not limited to, blocked amines.

One or more conventional catalysts which accelerate the isocyanate-polyol reaction may be used, including tertiary amines, organo metallic compounds or mixtures thereof.

In certain embodiments, organo metallic compounds such as tin compounds may be used as catalysts. For purposes of illustration but not by way of limitation, organo metallic compounds such as stannous octoate, stannous chloride, dibutyltin dilaurate, dibutyltin diacetate, dibutyltin-di-2 ethyl hexoate and the like, or other suitable organo metallic compounds such as bismuth octoate, zinc octoate and the like may be used as catalysts.

In certain embodiments, one or more conventional tertiary amine catalysts may be used. For purposes of illustration but not by way of limitation, tertiary amines may include triethylenediamine, dimethylethanolamine, triethanolamine, N-ethyl morpholine, N-methyldicyclohexylamine, N,N-dimethyl cyclohexylamine, N,N,N',N'-tetrmmethyl-1,3-butanediamine, ether and the like.

The amount of catalysts, if used, may be in certain embodiments about 0.05 to about 1 weight percent and in certain embodiments about 0.1 to about 0.4 weight percent, based on the total weight of the formulation.

In certain embodiments, a complexing agent which reacts with the catalyst to slow down its reactivity after the polyurethane formulation has been packaged may be used. For purposes of illustration but not by way of limitation, the complexing agent may comprise diethyl malonate. In certain embodiments, the amount of the complexing agent may typically be about 0.05 to about 1.5 weight percent, and in certain embodiments about 0.1 to about 0.5 weight percent, based on the total weight of the formulation.

In certain embodiments, to avoid the inclusion of water during processing, an alkaline earth metal oxide, such as calcium oxide or calcium sulfate, may be included in the formulation as a de-watering agent, i.e., drying agent, for scavenging water from the formulation.

The additional polyurethane components may be incorporated separately or may be combined with any reaction component.

The additional ingredients may be mixed by conventional means, such as in an inert, dry atmosphere. The ingredients may be mixed together all at one time (in a "one stage" process); alternatively, some ingredients and/or portions of ingredients may be mixed together in one operation (or "stage"), with other ingredients and/or portions of ingredients added in an additional stage or stages. Normally, the ingredients may be heated above room temperature. The ingredients may be heated before, during, or after the process of mixing. If more than one stage of addition of ingredients and/or mixing and/or heating is used, the mixture of one stage may be heated for a time before the next stage is added. Typical temperature of heating is about 65° C. to about 85° C. If more than one stage is used, the temperature of each stage may be chosen independently. During any of the mixing and/or heating stages, full or partial vacuum may be applied; also nitrogen gas or other dry and/or inert gas may be used to blanket the surface of the mixture. In addition, a catalyst may optionally be admixed with the ingredients, either before, during, or after any one or more of the stages of mixing the ingredients. The formulation is stored, in certain embodiments under an inert, dry atmosphere until use.

The green adhesive is used to adhere a first substrate to a second substrate by dispensing the adhesive from a caulking gun, or by spraying, brushing rolling, squeegeeing, scraping, troweling, and combinations thereof.

The adhesive or sealant formulations may be applied to a substrate, such as the surface of at least one of concrete, stone, metal, ceramic, glass, plastic, wood, asphalt, vinyl, carpet, thermoplastic materials, thermoset materials, rubber or composite materials by techniques known in the art, prior to the cure of the formulation. The substrates to be bonded may be the same or different.

Improved performance is typically obtained for firm, clean and dry load bearing substrate surfaces free of loose and brittle particles, and without substances which impair adhesion such as oil, grease, rubber skid marks, paint, or other contaminants. Surface preparation before application of the formulation as an adhesive, sealant, or coating can include water-blasting, sandblasing, cleaning, drying and the like.

The applied formulation is subjected to moisture which will allow the formulation to cure to an irreversible solid form. Moisture may take the form of ambient humidity, artificially increased or controlled humidified air, a mist of water droplets, a spray of liquid water contacting the applied formulation, or combinations thereof.

The following specific examples are given to illustrate, but not limit, the preparation of the green polyurethane prepolymer, adhesive and sealant formulations as discussed above.

Example 1

Green Prepolymer Synthesis

Table 1 below indicates ranges of components of a representative formulation for synthesizing the green polyurethane prepolymer.

TABLE 1

| Component | Range (Wt %) |
|---|---|
| Vertellus Polycin ® polyol (GR-35) | 45-62% |
| Balance 50 | 15-22% |
| IPDI | 10-22% |
| Dabco 33LV or Dabco BL-19 | 0.05-1% |
| DINCH | 5-15% |
| PTSI | 0.5-3% |

The NCO:OH ratio was in the range of 1.75:1 to 2.1:1. Percent of NCO in the prepolymer was in the range of 1.75% to 2.8%.

Procedure:

Both polyols were introduced into the reactor and mixed for 10 minutes. DINCH was added. After blending DINCH with polyols, the moisture of the batch was measured by Karl Fisher titration and if the polyol mixture has low moisture, no extra IPDI amount is added. If required, an extra amount of IPDI needed to compensate for moisture was calculated and added to the amount of IPDI needed for reacting with polyols at an NCO:OH ratio of 1.8:1. The IPDI was added to the mixture and the batch heated to 74° F. The required amount of Dabco catalyst was added. Heat was generated from the exothermic reaction between the isocyanate and polyol. The temperature was maintained at 165° F. and the reaction allowed to proceed for 3-4 hours, at which time a sample was withdrawn to measure the experimental NCO % to determine if it was close to the theoretical NCO %. The NCO % measurements were taken by 0.1N HCl Titration using an automatic titrator, as per ASTM D-2572-80 (Test method for Isocyanate Groups in Urethane Prepolymers). The heat was turned off and the batch allowed to cool down when the experimental NCO % approached the theoretical (with a standard deviation of ±0.2). When the temperature was between 120-125° F., the required amount of PTSI drying agent was added, and the mixture was mixed for about 30 minutes. The batch was then emptied.

Example 2

Preparation of Green Prepolymer

A green polyurethane prepolymer was prepared from the following components:

TABLE 2

| Component | Weight (g) | Percent | Moisture (%) | 3200 g. Batch |
|---|---|---|---|---|
| Polycin GR-35 | 59.75 | 59.75 | 0.009 | 1912. |
| Lupranol ® Balance 50 | 20.6 | 20.6 | 0.054 | 659.2 |
| DINCH | 6.1 | 6.1 | | 195.2 |
| IPDI | 11.45 | 11.45 | | 366.4 |
| Dabco BL-19 | 0.1 | 0.1 | | 3.2 |
| PTSI | 2. | 2. | | 64. |
| Total | 100 | 100 | | 3200 |

Procedure:

Both polyols were introduced into the reactor and mixed for 10 minutes. Subsequently, DINCH was blended into the polyol mixture. The moisture of the batch was measured by Karl Fisher titration and an extra amount of IPDI (4.328) needed to compensate for moisture was calculated and added to the 366.40 g. IPDI needed for reacting with polyols at an NCO:OH ratio of 1.8:1, for a total amount of isocyanate of 370.72. The IPDI was added to the mixture and the batch heated to 74. The required amount of catalyst (DABCO 33LV) was added. Heat was generated from the exothermic reaction between the isocyanate and polyol. The temperature was maintained at 165° F. and the reaction was allowed to proceed for 3-4 hours, at which time a sample was withdrawn to measure the experimental NCO % to determine if it was close to the theoretical NCO % of 2%. The heat was turned off when the experimental NCO % approached the theoretical (with a standard deviation of ±0.2). Two NCO % measurements were taken by 0.1N HCl Titration using an automatic titrator, as per ASTM D-2572-80 (Test method for isocyanate Groups in Urethane Prepolymers). The first reading was 2.048 and the second reading was 2.04. The heat was turned off and the batch allowed to cool down. When the temperature was between 120-125° F., the required amount of PTSI drying agent was added, and the mixture was mixed for about 20-30 minutes. The batch was then emptied.

The NCO:OH ratio was in the range of 1.75:1 to 2.1:1. Percent of NCO in the prepolymer was in the range of 1.75% to 2.8%. The viscosity was measured at 118 poise at 72° F.

Example 3

Preparation of Green Prepolymer

A green polyurethane prepolymer was prepared from the following components:

TABLE 3

| Component | Weight (g) | Percent | 3200 g. Batch |
|---|---|---|---|
| Polycin GR-35 | 59.93 | 59.96 | 1918.72 |
| Lupranol ® Balance 50 | 20.67 | 20.68 | 661.77 |
| DINCH | 7.20 | 7.2 | 230.52 |
| Desmodur ® 1 IPDI | 11.25 | 11.26 | 360.18 |
| Dabco 33LV | 0.1 | 0.1 | 3.20 |
| PTSI | 0.8 | 0.8 | 25.61 |
| Total | 99.95 | 100 | 3200 |

Procedure:

The green polyurethane prepolymer was prepared following the procedure of Examples 1 and 2. The theoretical NCO % was 1.890%; the two NCO % measurements were 1.910 and 1.903. The 360.18 g IPDI needed for reacting with polyols at an NCO:OH ratio of 1.9:1 was added. The viscosity was in the range of about 110-130 poise at 72° F.

Example 4

Preparation of Prepolymer

A green polyurethane prepolymer was prepared from the following components:

TABLE 4

| Component | Weight (g) | Percent | Moisture (%) | 3200 g. Batch |
|---|---|---|---|---|
| Polycin GR-35 | 60.88 | 60.88 | 0.009 | 1948.16 |
| Lupranol ® Balance 50 | 20.99 | 20.99 | 0.053 | 671.68 |
| DINCH | 5.80 | 5.80 | | 185.6 |
| IPDI | 11.43 | 11.43 | | 365.76 |
| Dabco 33LV | 0.1 | 0.1 | | 3.2 |
| PTSI | 0.8 | 0.8 | | 25.6 |
| Total | 100 | 100 | | 3200 |

Procedure:

The green polyurethane prepolymer was prepared following the procedure of Examples 1 and 2. The theoretical NCO % was 1.92%; the two NCO % measurements were 2.015% and 2.052%. The extra amount of IPDI (4.40 g) to compensate for moisture in the polyol mixture was added to the 365.76 g. IPDI needed for reacting with polyols at an NCO:OH ratio of 1.9:1, for a total amount of isocyanate of 370.16. The viscosity was measured at 121 poise at 72° F.

Example 5

Preparation of Green Prepolymer

TABLE 5

| Component | Weight (g) | Percent | Moisture (%) | 3200 g. Batch |
|---|---|---|---|---|
| Polycin GR-35 | 60.23 | 60.23 | 0.009 | 1927.36 |
| Lupranol ® Balance 50 | 20.77 | 20.77 | 0.053 | 664.64 |
| DINCH | 5.8 | 5.8 | | 185.6 |
| IPDI | 11.3 | 11.3 | | 361.6 |
| Dabco 33LV | 0.1 | 0.1 | | 3.2 |
| PTSI | 1.8 | 1.8 | | 57.6 |
| Total | 100 | 100 | | 3200 |

Procedure:

The green polyurethane prepolymer was prepared following the procedure of Examples 1 and 2. The theoretical NCO % was 1.9191%; the two NCO % measurements were 2.003% and 2.012%. The extra amount of IPDI (4.328) was added to the 361.60 g. IPDI needed for reacting with polyols at an NCO:OH ratio of 1.9:1, for a total amount of isocyanate of 370.72. The viscosity was in the range of about 110-130 poise at 72° F.

Example 6

Preparation of Green Prepolymer

A green polyurethane polymer was prepared from the following components:

TABLE 6

| Component | Weight (g) | Percent | 2800.00 g. Batch |
|---|---|---|---|
| Polycin GR-35 | 60.03 | 60.03 | 1680.84 |
| Lupranol ® Balance 50 | 20.7 | 20.70 | 579.60 |
| DINCH | 5.8 | 5.8 | 162.4 |
| IPDI | 11.27 | 11.27 | 315.56 |
| Dabco 33LV | 0.2 | 0.2 | 5.6 |
| PTSI | 2 | 2 | 56 |
| Total | 99.95 | 100 | 2800 |

Procedure:

The green polyurethane prepolymer was prepared following the procedure of Examples 1 and 2. The theoretical NCO % was 1.91657%; the NCO % measurement was 1.842. The 315.56 g. IPDI needed for reacting with polyols at an NCO:OH ratio of 1.9:1 was added. The viscosity was measured at 250 poise at 24° C. (72° F.).

Example 7

General Formulation of the Green Sealant

Table 7 below indicates ranges of components of a representative formulation for synthesizing the green sealant.

TABLE 7

| Component | Percent |
|---|---|
| Green Prepolymer | 35-40% |
| Calcium Oxide (drying agent) | 1-3% |
| Diethyl Malonate (DEM) (blocking agent) | 0.1-0.5% |
| Thixocarb 500 (filler) | 35-43% |
| LA-7 or LA 300 (recycled glass filler) | 10-12% |
| Kotamite (filler) | 10-12% |
| Foralyn 90 (hydrogenated Rosin ester) (adhesion promoter) | 1-5% |
| $TiO_2$ (Pigment) | 3-5% |
| Disparlon 6100 or 6200 (rheological additive) | 2-4% |
| Lowinox 44B25 (antioxidant) | 0.1-0.4% |
| SILANE, Silquest A187 (adhesion promoter) | 0.1-0.5% |
| UV & light stabilizers | 0.1-0.5% |
| DINCH (plasticizer) | 1-8% |
| Incozol NC (moisture scavenger) | 0.2-0.6% |
| Dabco BL-19 (catalyst) | 0.3-1% |

LOWINOX 44B25, a 4,4'-butylidenebis[2-(1,1-dimethethyl)-5-methylphenol] is an antioxidant marketed by Lowi Chemical.
Foralyn 90 (F-90) availabe from Eastman Chemical Company.
Kotamite available from Imerys Peformance Minerals North America.
Disparlon available from Kusumoto Chemicals, Ltd.
SILANE, Silquest A187 available from Crompton OSi Specialties.

General Procedure for Preparing the Green Sealant

The prepolymer was added to the Ross mixer followed by Calcium Oxide. The batch was mixed well for 10 minutes at 600 rpms. Diethyl Malonate was added to the batch and mixed for 10 minutes at 500 rpm. Kotamite or LA-7 or LA-300 recycled fillers were added, as well as Thixocarb 500, $TiO_2$ and F-90, and the batch mixed for 15 minutes at 900 rpm. Lowinox 42B25, A187, UV and light stabilizers and DINCH were added and the batch mixed for 10 minutes at 600 rpm. Disparlon was added and the batch mixed for 10 minutes at 600 rpm. The batch was then heated to 165° F. for the activation of the rheological additive. The blade was then mixed for 45-60 minutes at 600 rpm under vacuum. The batch was then cooled to 90° F. Incazol NC and Dabco BL-19 catalyst were added. The batch was mixed for 5 minutes at 600 rpm before applying vacuum. Mixing is continued for 10 minutes under vacuum. The batch was then emptied. Viscosity was measured at between 3500-8500 poise at 24° C. Sag, inch was measured at between 0-0.18 inch.

Example 8

Formulation of Green Sealant

A green polyurethane sealant was prepared from the following components:

TABLE 8

| Component | Weight (g) |
| --- | --- |
| Green Prepolymer of Example 1 | 39.50 |
| Calcium Oxide | 1.95 |
| Thixocarb 500 | 49.55 |
| Foralyn-90 | 1.5 |
| TiO$_2$ R902 | 3.95 |
| DINCH | 2.5 |
| Incozol NC | 0.45 |
| Dabco BL-19 | 0.6 |
| Total | 100 |

Procedure:

The prepolymer was added to the Ross mixer followed by Calcium Oxide drying agent. The batch was mixed well for 10 minutes at 600 rpms. Thixocarb 500 filler, Foralyn-90 as adhesion promoter, TiO$_2$ R902 pigment from DuPont and Hexamoll® DINCH plasticizer from BASF were added and the batch mixed for 10 minutes at 600 rpms. The batch was then heated to 170° P. The blade was then increased to 900 rpm and the batch mixed for 1.5 hours under vacuum. The batch was then cooled to 90° F. Incazol NC moisture scavenger, Dabco BL-19 catalyst, and additional DINCH plasticizer were added. The batch was mixed for 5 minutes before applying vacuum. Mixing was continued for 10 minutes under vacuum. The batch was then emptied.

| | Upon preparation | After 1 week in 140° F. oven |
| --- | --- | --- |
| Viscosity (poise) | 3800 | 13420 |
| Sag, inch | 0.16 | 0.38 |

FIG. 1 is a graphical representation of the results of an ASTM D412 Tensile Test for the Green Sealant of Example 8. Test results, including maximum load, tensile strength, tensile strength at maximum load, 100% modulus (psi), elongation (%) and thickness, are set forth below:

CHART 1

| | Maximum Load (lbf) | Tensile Strength (psi) | Tensile strain at Maximum Load (%) | 100% Modulus (psi) | Elongation (%) | Thickness (in) |
| --- | --- | --- | --- | --- | --- | --- |
| 1 | 5.0 | 261.0 | 733.33 | 64.62 | 734.90 | 0.076 |
| 2 | 4.5 | 224.1 | 680.00 | 64.39 | 681.67 | 0.080 |
| 3 | 3.5 | 190.9 | 658.33 | 58.24 | 658.33 | 0.074 |
| 4 | 4.7 | 250.5 | 705.00 | 67.72 | 708.33 | 0.075 |
| 5 | 6.6 | 328.0 | 806.67 | 68.90 | 806.67 | 0.080 |

CHART 1-continued

| | Maximum Load (lbf) | Tensile Strength (psi) | Tensile strain at Maximum Load (%) | 100% Modulus (psi) | Elongation (%) | Thickness (in) |
| --- | --- | --- | --- | --- | --- | --- |
| Mean | 4.8 | 250.9 | 716.67 | 64.77 | 717.98 | 0.077 |
| Std. Dev. | 1.09917 | 50.9009 | 57.57833 | 4.14007 | 57.27347 | 0.00283 |

The test data shows the tensile performance of the sealant, and demonstrates that the sealant has very good average tensile strength of 250.9 psi, elongation at break of 718%, 100% modulus of 64.8 psi, and a shore A hardness of 36. The test data demonstrates that it is a high performing elastomeric sealant which can have a high movement capability.

Example 9

Formulation of Green Sealant

A green polyurethane sealant was prepared from the following components:

TABLE 9

| Component | Weight (g) | Percent % | 3200 g. Batch |
| --- | --- | --- | --- |
| Green Prepolymer of Example 4 | 40 | 40 | 1280 |
| Calcium Oxide | 2.32 | 2.32 | 74.24 |
| Kotamite | 10.94 | 10.94 | 350.08 |
| Thixocarb 500 | 39.74 | 39.74 | 1271.68 |
| TiO$_2$ R902 | 3.5 | 3.5 | 112 |
| Disparlon 6100 | 1 | 1 | 32 |
| DINCH | 1.45 | 1.45 | 46.4 |
| Incozol NC | 0.45 | 0.45 | 14.4 |
| Dabco BL-19 | 0.6 | 0.6 | 19.2 |
| Total | 100 | 100 | 3200 |

Procedure:

The prepolymer was added to the Ross mixer followed by Calcium Oxide drying agent. The batch was mixed well for 10 minutes at 600 rpm. Kotamite, Thixocarb 500, TiO$_2$ R902 and DINCH were added and the batch mixed for 30 minutes at 900 rpm. The speed was educed to 600 rpm. Disparlon 6100 was added and the batch mixed for 10 minutes at 600 rpm. The batch was then heated to 165° F. The batch was mixed for 45 minutes at 600 rpm under vacuum. The batch was then cooled to 90° F. Incazol NC moisture scavenger and Dabco BL-19 catalyst were added. The batch was mixed for 5 minutes at 600 rpm before applying vacuum. Mixing was continued for 10 minutes under vacuum. The batch was then emptied.

| | Upon preparation | After 1 week in 140° F. oven |
| --- | --- | --- |
| Viscosity (poise) | 3800 | 13280 |
| Sag, inch | 0.50 | 0.4 |

Figure 2:
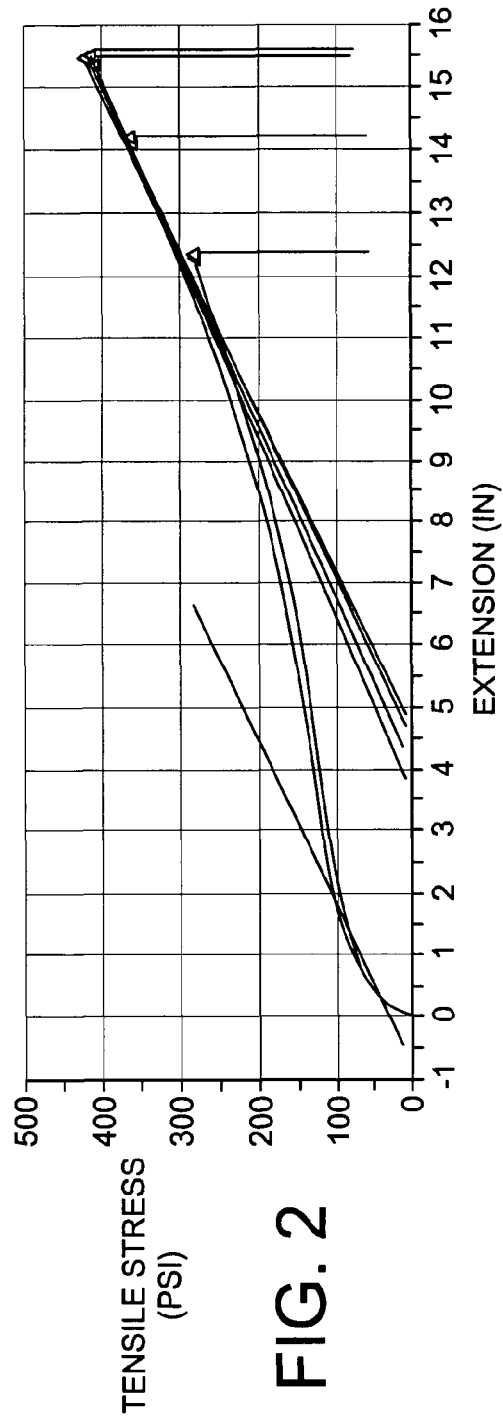
FIG. 2 is a graphical representation of the results of an ASTM D412 Tensile Test for the Green Sealant of Example 9.

FIG. 2 is a graphical representation of the results of an ASTM D412 Tensile Test for the Green Sealant of Example 9. Test results, including maximum load, tensile strength, tensile strength at maximum load, 100% modulus (psi), elongation (%) and thickness are set forth below

CHART 2

|   | Maximum Load (lbf) | Tensile Strength (psi) | Tensile strain at Maximum Load (%) | 100% Modulus (psi) | Elongation (%) | Thickness (in) |
|---|---|---|---|---|---|---|
| 1 | 6.2 | 415.9 | 775.00 | 105.22 | 775.00 | 0.060 |
| 2 | 4.8 | 284.5 | 616.67 | 96.70 | 618.33 | 0.068 |
| 3 | 6.8 | 425.1 | 775.00 | 99.39 | 775.00 | 0.064 |
| 4 | 6.7 | 414.4 | 776.67 | 99.74 | 781.27 | 0.065 |
| 5 | 5.9 | 364.7 | 710.00 | 102.35 | 710.00 | 0.065 |
| Mean | 6.4 | 405.0 | 759.17 | 101.67 | 760.32 | 0.064 |
| Std. Dev. | 0.41661 | 27.27737 | 32.78721 | 2.70527 | 33.67433 | 0.00238 |

The sealant has very good average tensile strength of 405 psi, elongation at break of 760%, 100% modulus of 101.7 psi, a shore A hardness of 45 and can function as a high performing sealant with a high movement capability.

Example 10

Formulation of Green Sealant

A green polyurethane sealant was prepared from the following components:

TABLE 10

| Component | Weight (g) | Percent % | 3200.00 g. Batch |
|---|---|---|---|
| Green Prepolymer of Example 5 | 39 | 39 | 1248 |
| Calcium Oxide | 2.15 | 2.15 | 68.8 |
| Diethyl Malonate (DEM) | 0.6 | 0.6 | 19.2 |
| Dry LA-300 | 10.1 | 10.1 | 323.2 |
| Thixocarb 500 | 41.05 | 41.05 | 1313.6 |
| Lowinox 44B25 | 0.75 | 0.75 | 24 |
| TiO$_2$ R902 | 4 | 4 | 128 |
| Disparlon 6100 | 1.7 | 1.7 | 54.4 |
| Incozol NC | 0.3 | 0.3 | 9.6 |
| Dabco BL-19 | 0.35 | 0.35 | 11.2 |
| Total | 100 | 100 | 3200 |

Procedure:

The green sealant was prepared following the procedure of Examples 7-9.

|   | Upon preparation | After 1 week in 140° F. oven |
|---|---|---|
| Viscosity (poise) | 9600 | Too hard to gun |
| Sag, inch | 0.08 | N/A |

Figure 3:
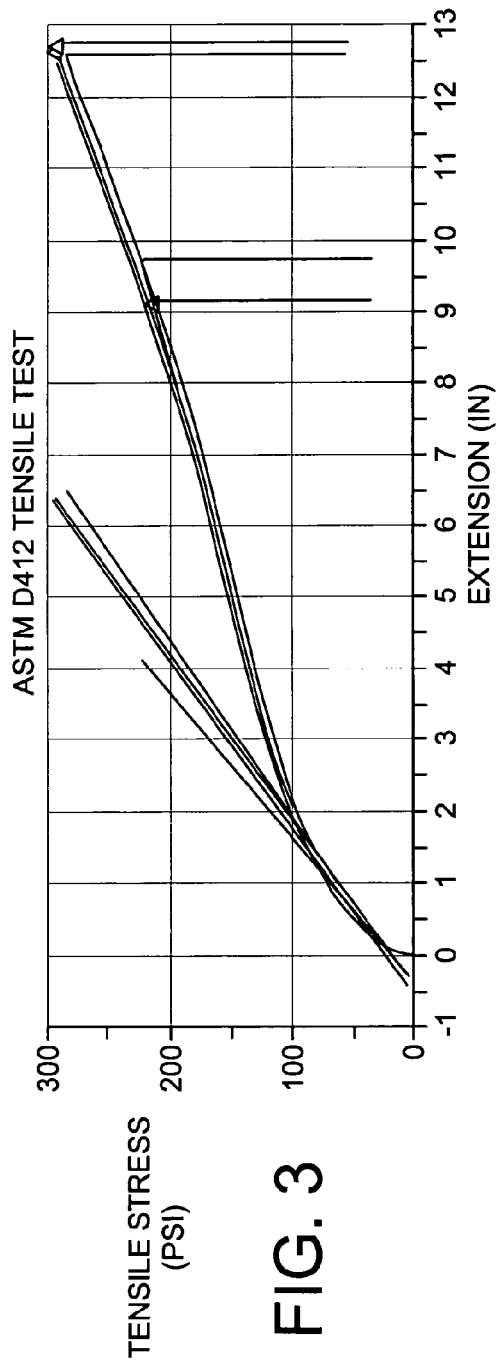
FIG. 3 is a graphical representation of the results of an ASTM D412 Tensile Test for the Green Sealant of Example 10.

FIG. 3 is a graphical representation of the results of an ASTM D412 Tensile Test for the Green Sealant of Example 10. Test results, including maximum load, tensile strength, tensile strength at maximum load, 100% modulus (psi), elongation (%) and thickness, are set forth below:

CHART 3

|   | Maximum Load (lbf) | Tensile Strength (psi) | Tensile strain at Maximum Load (%) | 100% Modulus (psi) | Elongation (%) | Thickness (in) |
|---|---|---|---|---|---|---|
| 1 | 4.0 | 292.2 | 633.03 | 99.70 | 634.70 | 0.055 |
| X2 | 3.0 | 221.6 | 483.47 | 99.64 | 485.13 | 0.055 |
| X3 | 2.9 | 214.0 | 454.77 | 98.95 | 456.43 | 0.054 |
| 4 | 4.0 | 295.1 | 629.67 | 102.22 | 634.27 | 0.054 |

CHART 3-continued

|   | Maximum Load (lbf) | Tensile Strength (psi) | Tensile strain at Maximum Load (%) | 100% Modulus (psi) | Elongation (%) | Thickness (in) |
|---|---|---|---|---|---|---|
| 5 | 3.9 | 283.0 | 625.97 | 95.80 | 628.93 | 0.055 |
| Mean | 4.0 | 290.1 | 629.55 | 99.24 | 632.63 | 0.055 |
| Std. Dev. | 0.06570 | 6.32760 | 3.53382 | 3.23576 | 3.21129 | 0.00058 |

The sealant has very good average tensile strength of 290 psi, elongation at break of 633%, 100% modulus of 99.2 psi, a shore A hardness of 44 and can function as a medium performing sealant.

Example 11

Formulation of Green Sealant

A green polyurethane sealant was prepared from the following components:

TABLE 11

| Component | Weight (g) | Percent % | 3200 g. Batch |
|---|---|---|---|
| Green prepolymer of Example 5 | 38 | 38 | 1216 |
| Calcium Oxide | 2.15 | 2.15 | 68.8 |
| Diethyl Malonate (DEM) | 0.6 | 0.6 | 19.2 |
| Dry LA-300 | 10.1 | 10.1 | 323.2 |
| Thixocarb 500 | 42.05 | 42.05 | 1345.6 |
| Lowinox 44B25 | 0.75 | 0.75 | 24 |
| TiO$_2$ R902 | 4 | 4 | 128 |
| Disparlon 6200 | 1.7 | 1.7 | 54.4 |
| Incozol NC | 0.3 | 0.3 | 9.6 |
| Dabco BL-19 | 0.35 | 0.35 | 11.2 |
| Total | 100 | 100 | 3200 |

Procedure:

The green sealant was prepared following the procedure of Examples 7-9.

|   | Upon preparation | After 1 week in 140° F. oven |
|---|---|---|
| Viscosity (poise) | 13200 | Too hard to dispence in caulking gun |
| Sag (inch) | 1.10 | N/A |

Figure 4:
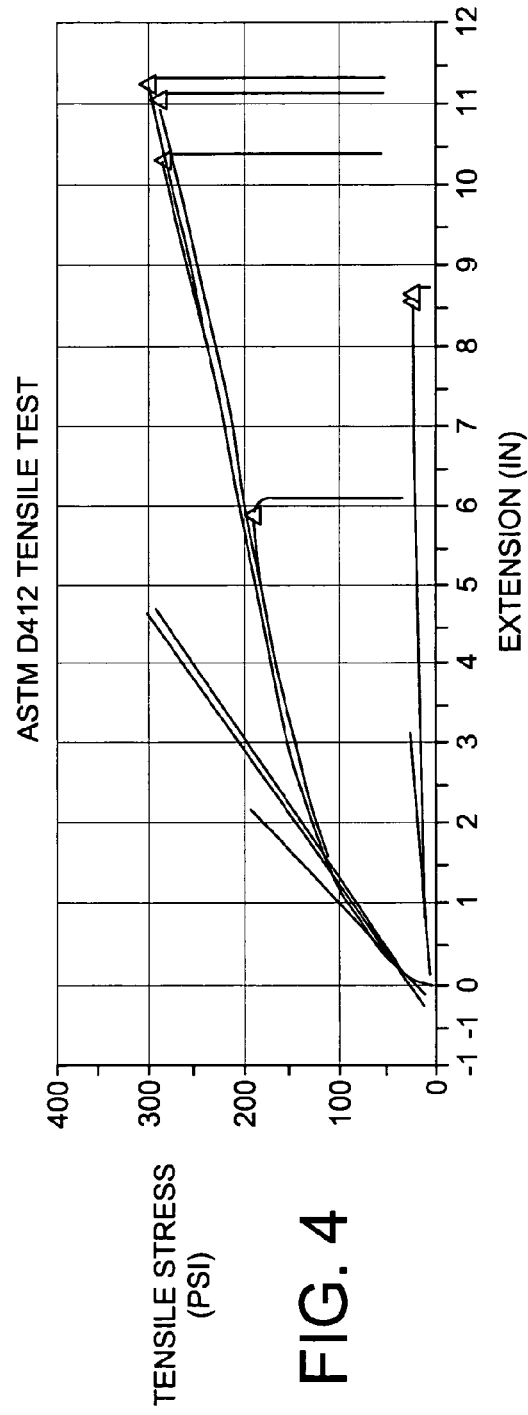
FIG. 4 is a graphical representation of the results of an ASTM D412 Tensile Test for the Green Sealant of Example 11.

FIG. 4 is a graphical representation of the results of an ASTM D412 Tensile Test for the Green Sealant of Example 11. Test results, including maximum load, tensile strength, tensile strength at maximum load, 100% modulus (psi), elongation (%) and thickness, are set forth below:

CHART 4

|   | Maximum Load (lbf) | Tensile Strength (psi) | Tensile strain at Maximum Load (%) | 100% Modulus (psi) | Elongation (%) | Thickness (in) |
|---|---|---|---|---|---|---|
| 1 | 5.5 | 301.8 | 561.80 | 129.07 | 564.67 | 0.073 |
| 2 | 5.4 | 291.5 | 553.87 | 123.71 | 555.00 | 0.074 |
| 3 | 4.9 | 288.4 | 514.40 | 126.28 | 517.33 | 0.068 |
| X4 | 3.7 | 24.6 | 428.03 | 12.96 | 435.37 | 0.600 |

CHART 4-continued

|  | Maximum Load (lbf) | Tensile Strength (psi) | Tensile strain at Maximum Load (%) | 100% Modulus (psi) | Elongation (%) | Thickness (in) |
|---|---|---|---|---|---|---|
| X5 | 2.8 | 192.2 | 291.20 | 124.44 | 303.30 | 0.058 |
| Mean | 5.3 | 293.9 | 543.36 | 126.35 | 545.67 | 0.072 |
| Std. Dev. | 0.32130 | 7.01879 | 25.38756 | 2.68076 | 25.00829 | 0.00321 |

The sealant has very good average tensile strength of 294 psi, elongation at break of 546%, 100% modulus of 126 psi, a shore A hardness of 47 and can function as a medium performing sealant.

Example 12

General Green Adhesive Formulation

Table 12 below indicates ranges of components of a representative formulation for synthesizing the green adhesive.

TABLE 12

| Component | Percentage Range |
|---|---|
| Green Prepolymer | 30-40% |
| Calcium Oxide (drying agent) | 1-3% |
| Mistron Vapor RE (Talc) | 5-30% |
| Drikalite (ground calcium carbonate) | 10-25% |
| Foralyn 90, Hydrogenated Rosin (adhesion promoter) | 0.5-2% |
| LA-7 (recycled glass filler) | 10-20% |
| DINCH (plasticizer) | 5-15% |
| Expancel | 0-0.5% |
| Incazol NC (moisture scavenger) | 0.2-0.6% |
| Dabco BL-19 (catalyst) | 0.3-1% |
| Bicat 3228 (catalyst) | 0.3-1% |

MISTRON VAPOR is powdered talc containing about 0.5% of free water marketed by Cypress Minerals.

Procedure:

The prepolymer was added to the Ross mixer followed by the Calcium Oxide and mixed well for 10 minutes at 600 rpm. Drikalite, Mistron Vapor RE, Dry LA-7, F90 and DINCH were added. The batch was mixed for 10 minutes at 600 rpm. The batch was then heated to 175° F. Expencel was added and the batch mixed for 10 minutes. Incozol NC and the catalysts were added. The batch was mixed for 5 minutes at 600 rpm before applying vacuum. Mixing was continued for 10 minutes under vacuum. The batch was then emptied.

Viscosity of the adhesive was between 1000-3000 poise at 24° C. The skin time is between 60-90 minutes. Skin time is the time required for forming a surface skin i.e., starting of cure.

Example 13

Preparation of Green Adhesive

A green polyurethane adhesive was prepared from the following components:

TABLE 13

| Component | Percentage (%) | Weight (g.) |
|---|---|---|
| Prepolymer of Example 6 | 30.00 | 960 |
| Calcium Oxide | 1.95 | 62.4 |
| Dry LA-7 | 20.34 | 650.88 |
| Mistron Vapor RE | 13.30 | 425.6 |
| Drikalite | 20.56 | 657.92 |
| F90 | 1.50 | 48 |
| DINCH | 11.25 | 360 |
| Expancel | 0.35 | 11.2 |
| Incozol NC | 0.25 | 8 |
| Bicat 3228 catalyst | 0.50 | 16 |
| Total | 100 | 3200 |

Procedure:

The prepolymer and Calcium Oxide were added to the Ross mixer and mixed well for 10 minutes at 600 rpm. Drikalite, Mistra Vapor RE, Dry LA-7, F90 and DINCH were added. The batch was mixed for 10 minutes at 600 rpm. The batch was then heated to 175° F., the blade increased to 900 rpm, and the batch mixed for 46 minutes under vacuum. The blade was reduced to 500 rpm. The batch was cooled to 90° F. Expancel was added and the batch mixed for 10 minutes. Incozol NC and the catalyst were added. The batch was mixed for 5 minutes before applying vacuum. Mixing was continued for 10 minutes under vacuum. The batch was then emptied.

Viscosity: 1920 poise at 24° C.

Density: 11.59 lbs/gal

Skin time: 90 minutes

Shore A: 36.8

Figure 5:
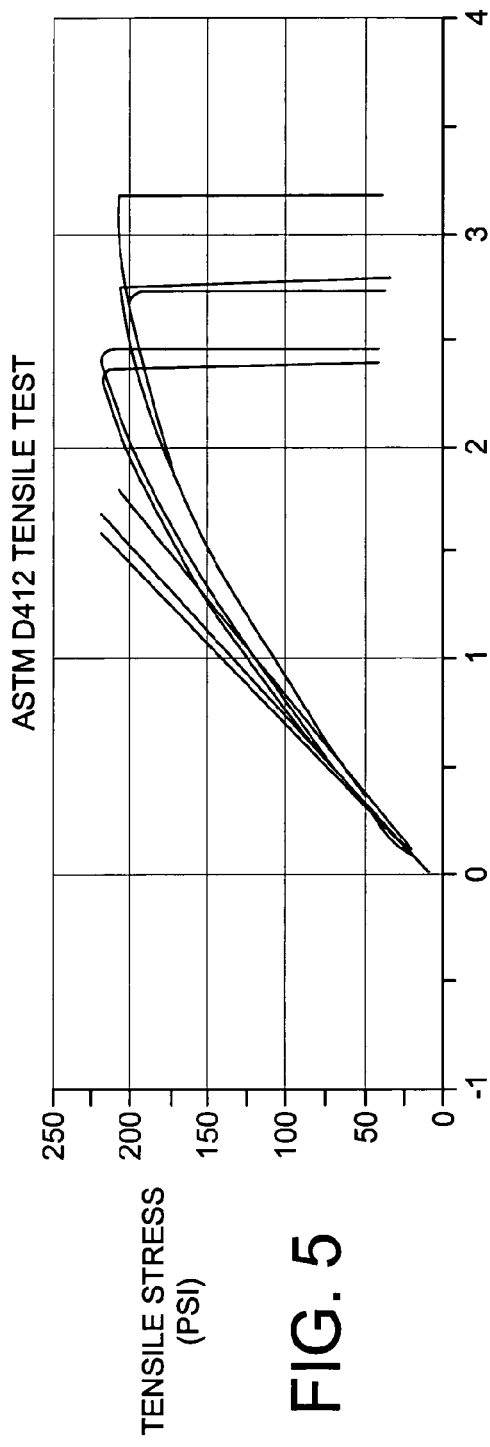
FIG. 5 is a graphical representation of the results of an ASTM D412 Tensile Test for the Adhesive of Example 13.

FIG. 5 is a graphical representation of the results of a Rubber-Tensile Test (Method A) for the adhesive of Example 13 as measured by ASTM D412 Tensile Test. Test results, including maximum load, tensile strength, tensile strength at maximum load, 100% modulus (psi), elongation (%) and thickness, are set forth below:

CHART 5

|  | Maximum Load (lbf) | Tensile Strength (psi) | Tensile strain at Maximum Load (%) | 100% Modulus (psi) | Elongation (%) | Thickness (in) |
|---|---|---|---|---|---|---|
| 1 | 2.3 | 207.0 | 136.67 | 178.52 | 138.33 | 0.045 |
| 2 | 2.2 | 208.1 | 156.67 | 176.25 | 158.33 | 0.043 |
| 3 | 2.3 | 218.1 | 118.33 | 202.65 | 119.93 | 0.042 |
| X4 | 2.2 | 200.5 | 133.33 | 176.14 | 136.67 | 0.043 |
| X5 | 2.4 | 218.9 | 121.67 | 198.24 | 123.33 | 0.043 |
| Mean | 2.3 | 210.5 | 133.33 | 186.36 | 135.32 | 0.043 |
| Std. Dev. | 0.07905 | 7.84427 | 15.13837 | 12.98663 | 15.17358 | 0.00110 |

The test data shows the tensile performance of the adhesive. Tensile strength of the adhesive indicates how much stress the adhesive can withstand before it undergoes breaking under stretching conditions. This formulation had an average tensile strength of 210.5 psi which is very good for an adhesive. The five samples tested were from same batch and from the same shed.

Figure 6:
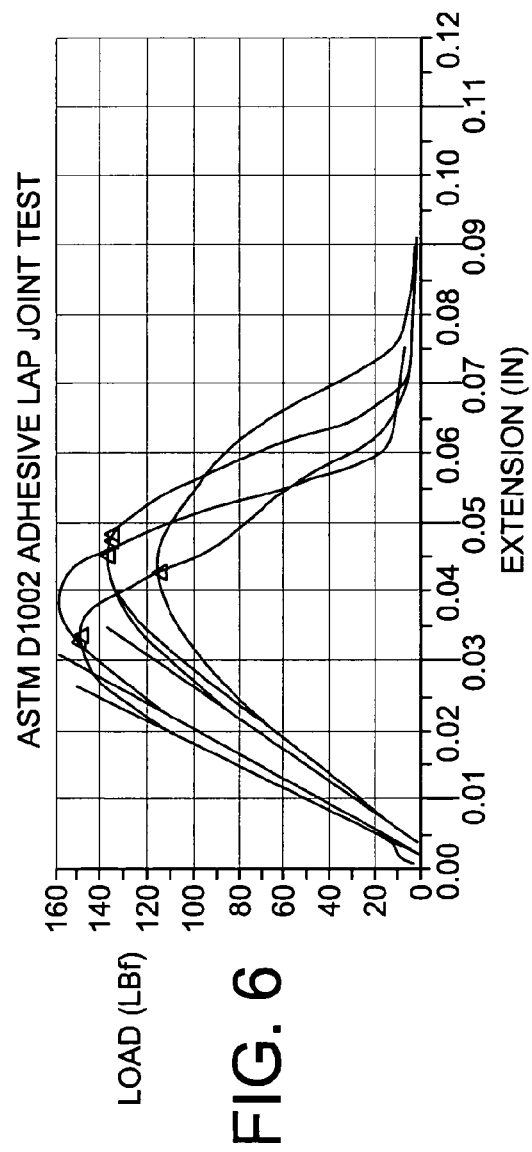
FIG. 6 is a graphical representation of the results of an ASTM D1002 Adhesive Lap Joint Test for the Adhesive of Example 13. (wood on wood, 7 days).

FIG. 6 is a graphical representation of the results of an Adhesive-Shear by Tension (Metal-Metal) Test for the Adhesive of Example 13 as measured by ASTM D1002 Adhesive Lap Joint Test. Test results, including maximum load, tensile strength, tensile stress at maximum load, loss, width, and length of overlap, mare set forth below:

CHART 6

|      | Maximum Load (lbf) | Tensile stress at Maximum Load (psi) | Loss (% coh) | Width (in) | Length of Overlap (in) |
|------|--------|--------|-----|-------|-------|
| 1    | 136.59 | 135.32 | 100 | 0.980 | 1.030 |
| 2    | 158.26 | 159.86 | 100 | 1.000 | 0.990 |
| 3    | 148.85 | 141.76 | 100 | 1.000 | 1.050 |
| 4    | 114.39 | 119.15 | 100 | 0.960 | 1.000 |
| 5    | 134.97 | 128.54 | 100 | 1.000 | 1.050 |
| Mean | 138.61 | 136.93 |     | 0.988 | 1.024 |
| Std. Dev. | 16.54651 | 15.31487 |  | 0.01789 | 0.02793 |

The test conditions were wood on wood, 7 days, i.e., the adhesive was applied between two wood substrates, cured and tested. The five samples tested were from the same batch. The average adhesive strength of the adhesive when tested between two wood pieces was 136.9 psi with 100% cohesive failures, no adhesive failures.

Figure 7:
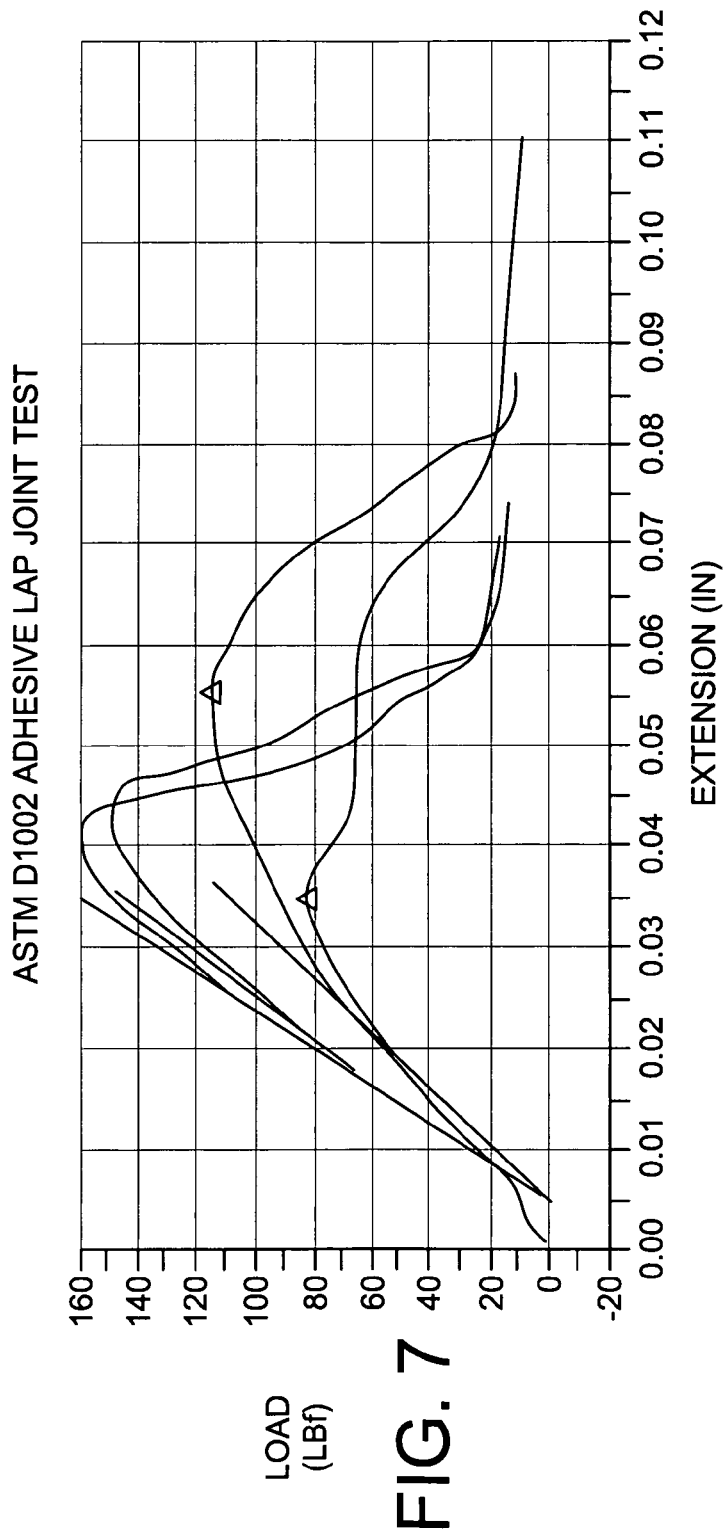
FIG. 7 is a graphical representation of the results of an ASTM D1002 Adhesive Lap Joint Test for the Adhesive of Example 13. (wood on concrete, 7 days).

FIG. 7 is a graphical representation of the results of an Adhesive-Shear by Tension (Metal-Metal) Test for the Adhesive of Example 13 as measured by ASTM D1002 Adhesive Lap Joint Test. Test results, including maximum load, tensile strength, tensile stress at maximum load, loss, width, and length of overlap, are set forth below:

CHART 7

|      | Maximum Load (lbf) | Tensile stress at Maximum Load (psi) | Loss (% coh) | Width (in) | Length of Overlap (in) |
|------|--------|--------|-----|-------|-------|
| 1    | 81.68  | 82.52  | 100 | 1.010 | 0.980 |
| 2    | 159.88 | 158.30 | 100 | 1.010 | 1.000 |
| 3    | 115.19 | 112.93 | 100 | 1.020 | 1.000 |
| 4    | 148.95 | 148.96 | 100 | 1.010 | 0.990 |
| 5    | 115.19 | 116.35 | 100 | 1.000 | 0.990 |
| Mean | 124.18 | 123.81 |     | 1.010 | 0.992 |
| Std. Dev. | 31.04693 | 30.41587 |  | 0.00707 | 0.00837 |

The test conditions were wood on concrete, 7 days, i.e., the adhesive was applied between wood/concrete substrates, cured and tested. The five samples tested are from the same batch. The average adhesive strength of the adhesive when tested between wood and concrete pieces was 123.8 psi with 100% cohesive failures, no adhesive failures.

The results shown in the above Tables and the attached Figures demonstrate the green sealant/adhesive have similar performance properties when compared to respective conventional sealants/adhesives even though it is derived from natural sources. The green sealant/adhesive may advantageously include phthalate free plasticizers, non-metal catalysts, recycled fillers, and has a zero to low VOC and low odor characteristics.

The invention claimed is:

1. A polyurethane prepolymer comprising:
   the reaction product of a reactant formulation comprising:
   a. a polyol entirely derived from a natural oil;
   b. a natural oil-petroleum blend polyol;
   c. an isocyanate,
   d. at least one catalyst,
   e. drying agent, and
   f. plasticizer,
   wherein the prepolymer has a bio-based content of from about 15% to about 75% by weight.

2. The prepolymer of claim 1 wherein the polyol entirely derived from a natural oil is a 100% castor oil based polyol.

3. The prepolymer of claim 2 wherein the 100% castor oil based polyol has at least one of a number average molecular weight (Mn) of about 3400 grams/mole to about 4000 grams/mole, a functionality of 2, or a hydroxyl number from 33 to 40.

4. The prepolymer of claim 1 wherein the natural oil-petroleum blend polyol comprises a castor oil-petroleum blend polyol having a functionality of from 2 to about 2.75.

5. The prepolymer of claim 1 wherein the isocyanate comprises at least one of toluene diisocyanates, methylene diphenyl diisocyanates, phenylene diisocyanate, xylylene diisocyanate, diphenylmethane diisocyanate, polyphenylmethane polyisocyanate (Polymeric MDI), naphthalene diisocyanate, triphenylmethane triisocyanate, diphenyl sulfone diisocyanate, cyclohexane diisocyanates, ethylene diisocyanate, propylene diisocyanate, tetramethylene diisocyanate, hexamethylene diisocyanates, isophorone diisocyanate, dimers or trimers of these diisocyanates or mixtures thereof.

6. The prepolymer of claim 5 wherein the isocyanate comprises at least one of toluene 2,4-diisocyanate, toluene 2,6-diisocyanate, naphthylene 1,5-diisocyanate, 4,4'-methylene diphenyl diisocyanate, 2,4'-methylene diphenyl diisocyanate, 1-methyl-2,4-diisocyanatocyclohexane, 1-methyl-2,6-diisocyanato cyclohexane, 4,4'-dicyclohexylmethane diisocyanate, urethodione diisocyanate, isocyanurate triisocyanate, hexamethylene-1,6-diisocyanate, tetramethylene-1,4-diisocyanate, cyclohexane-1,4-diisocyanate, hexahydrotolylene diisocyanate (and isomers), 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate; 3,3'-dimethyldiphenylmethane-4,4'-diisocyanate, dimers or trimers of these isocyanates, or mixtures thereof.

7. The prepolymer of claim 1 wherein the isocyanate comprises at least one of 1-isocyanatomethyl-3-isocyanato-1,5,5-trimethyl diisocyanate (isophorone diisocyanate, IPDI), toluene diisocyanate (TDI), methylene diphenyl diisocyanate (MDI), or mixtures thereof.

8. The prepolymer of claim 1 wherein the plasticizer is a phthalate-free plasticizer.

9. The prepolymer of claim 1 comprising:
   the reaction product of a reactant formulation comprising:
   a. from about 45% to about 65% by weight, based on the total weight of the prepolymer, of a 100% castor oil based polyol having a functionality of 2,
   b. from about 20% to 45% by weight, based on the total weight of the prepolymer, of a castor oil-petroleum blend polyol having a functionality of about 2 to about 2.75;
   c. from about 10% to about 20% by weight, based on the total weight of the prepolymer, of isophorone diisocyante (IPDI);
   d. from about 0.05% to about 1% by weight, based on the total weight of the prepolymer, of at least one catalyst;
   e. from about 5% to about 8% by weight, based on the total weight of the prepolymer, of a phthalate-free plasticizer; and
   f. from about 0.5% to about 3% by weight, based on the total weight of the prepolymer, of a drying agent,
   wherein the prepolymer has a bio-based content of from about 15% to about 75% by weight.

10. The prepolymer of claim 9 comprising:
    the reaction product of a reactant formulation comprising:
    a. from about 58% to about 62% by weight, based on the total weight of the prepolymer, of a 100% castor oil based polyol having a functionality of 2, b. from about 19% to about 22% by weight, based on the total weight of the prepolymer, of a castor oil-petroleum blend polyol having a functionality of about 2.7 to about 2.75;

c. from about 10% to about 14% by weight, based on the total weight of the prepolymer, of isophorone diisocyanate (IPDI);

d. from about 0.1% to about 0.4% by weight, based on the total weight of the prepolymer, of at least one tertiary amine catalyst;

e. from about 5% to about 8% by weight, based on the total weight of the prepolymer, of a phthalate-free plasticizer; and f. from about 1% to about 2% by weight, based on the total weight of the prepolymer, of a drying agent, wherein the prepolymer has a bio-based content of from about 15% to about 75% by weight.

11. The prepolymer of claim 1, wherein said prepolymer has an NCO content of from 1% to 3% by weight.

12. The prepolymer of claim 1 wherein the polyol entirely derived from a natural oil is a 100% vegetable oil polyol.

13. A method for making a polyurethane prepolymer comprising reacting:
   a. a polyol entirely derived from a natural oil;
   b. a natural oil-petroleum blend polyol;
   c. an isocyanate;
   d. at least one catalyst;
   e. plasticizer; and
   f. drying agent for a sufficient time to produce a polyurethane prepolymer, wherein the prepolymer has a bio-based content of from about 15% to about 75% by weight.

14. Adhesive, sealant or coating composition comprising the polyurethane prepolymer according to claim 1.

15. A moisture-curable polyurethane adhesive according to claim 14 wherein the adhesive exhibits at least one of a bio-based content of from about 10% to about 20% by weight, an adhesive strength from about 100 to about 175 psi, or a viscosity of from about 1200 poise to about 2000 poise at 24° C.

16. The adhesive of claim 15 additionally comprising at least one of organic fillers, inorganic fillers, plasticizers, chain extenders, antioxidants, UV stabilizers, light stabilizers, fungicides, mildewcides, biocides, fire retardants, surface additives, coloring agents, solvents, mineral oils, thixotropic agents, dispersing agents, adhesion promoters, catalysts, defoaming agents, storage stabilizers, latent hardeners, drying agents, cure retarders, or mixtures thereof.

17. A method for making a moisture-curable polyurethane adhesive capable of curing to form a reaction product, the method comprising:

providing a polyurethane prepolymer according to claim 1, and admixing with the polyurethane prepolymer at least one additive comprising organic fillers, inorganic fillers, plasticizers, chain extenders, antioxidants, UV stabilizers, light stabilizers, fungicides, mildewcides, biocides, fire retardants, surface additives, coloring agents, solvents, mineral oils, thixotropic agents, dispersing agents, adhesion promoters, catalysts, defoaming agents, storage stabilizers, latent hardeners, drying agents, cure retarders, or mixtures thereof, for a sufficient time to produce the polyurethane adhesive.

18. A paintable, one component, moisture curable polyurethane sealant according to claim 14 wherein the sealant exhibits at least one of a bio-based content of from about 5% to about 28% by weight, a 100% Modulus of from about 40 to about 85 psi, an elongation at break of from about 400% to about 850%, a Shore A hardness of from about 20 to about 50, a tensile strength of from about 150 to about 405 psi, a viscosity of from about 3500 to about 8500 poise at 24° C., or a sag of from about 0 to 0.18 inch.

19. The sealant of claim 18 additionally comprising at least one of organic fillers, inorganic fillers, plasticizers, chain extenders, antioxidants, UV stabilizers, light stabilizers, fungicides, mildewcides, biocides, fire retardants, surface additives, coloring agents, solvents, mineral oils, thixotropic agents, dispersing agents, adhesion promoters, catalysts, defoaming agents, storage stabilizers, latent hardeners, drying agents, cure retarders, or mixtures thereof.

20. A method for making a moisture-curable polyurethane sealant capable of curing to form a reaction product, the method comprising:

providing a polyurethane prepolymer according to claim 1; and admixing with the polyurethane prepolymer at least one additive comprising organic fillers, inorganic fillers, plasticizers, chain extenders, antioxidants, UV stabilizers, light stabilizers, fungicides, mildewcides, biocides, fire retardants, surface additives, coloring agents, solvents, mineral oils, thixotropic agents, dispersing agents, adhesion promoters, catalysts, defoaming agents, storage stabilizers, latent hardeners, drying agents, cure retarders, or mixtures thereof, for a sufficient time to produce a polyurethane sealant.

21. The method of claim 20 wherein the sealant exhibits at least one of a bio-based content of from about 5% to about 28% by weight, a 100% Modulus of from about 40 to about 85 psi, an elongation at break of from about 400% to about 850%, a Shore A hardness of from about 20 to about 50, a tensile strength of from about 150 to about 405 psi, a viscosity of from about 3500 to about 8500 poise at 24° C., or a sag of from about 0 to 0.18 inch.

* * * * *